United States Patent [19]

Powanda et al.

[11] 3,992,276

[45] Nov. 16, 1976

[54] UNSATURATED POLYESTERS FOR ULTRAVIOLET CURABLE COATINGS

[75] Inventors: Thomas M. Powanda, Middlesex; Charles B. Rybny, Clifton; Charles A. DeFazio, Berkeley Heights, all of N.J.

[73] Assignee: Celanese Corporation, New York, N.Y.

[22] Filed: Mar. 17, 1975

[21] Appl. No.: 558,977

[52] U.S. Cl. .................... 204/159.16; 204/159.12; 204/159.13; 204/159.15; 204/159.17; 204/159.18; 204/159.19; 260/862; 260/873; 260/885; 260/901; 427/35; 427/53; 427/54; 428/458

[51] Int. Cl.² .................... C08F 8/00; C08L 33/12; C08L 67/06

[58] Field of Search ................. 204/159.16, 159.18, 204/159.19, 159.15; 260/885, 862, 873, 901

[56] References Cited
UNITED STATES PATENTS

| | | | |
|---|---|---|---|
| 3,759,807 | 9/1973 | Osborn et al. | 204/159.23 |
| 3,770,490 | 11/1973 | Parker | 204/159.16 |
| 3,865,901 | 2/1975 | Klein-Doepke et al. | 204/159.15 |
| 3,874,906 | 4/1975 | Prucnal et al. | 204/159.16 |
| 3,876,587 | 4/1975 | Matsui et al. | 260/78.4 D |
| 3,879,340 | 4/1975 | Sekmakas et al. | 260/862 |

*Primary Examiner*—Murray Tillman
*Assistant Examiner*—Thurman K. Page

[57] ABSTRACT

An ultraviolet curable coating composition having improved clarity and resin compatability is prepared by co-reacting an acrylate or methacrylate co-polymer containing hydroxy and carboxy groups with added polyol and maleic anhydride to form an unsaturated polyester, and then blending the unsaturated polyester with polyunsaturated monomers, monounsaturated monomers and a photoinitiator, all of which will cure when exposed to ultraviolet radiation.

11 Claims, No Drawings

UNSATURATED POLYESTERS FOR ULTRAVIOLET CURABLE COATINGS

BACKGROUND OF INVENTION

This invention relates to ultraviolet curable coating compositions and to a method for preparing same. More particularly, this invention relates to a method for preparing ultraviolet curable coating compositions containing unsaturated polyester resins.

Most ultraviolet curable coating compositions have contained essentially monomeric reactants, although blends of monomeric reactants and nonreactive polymers have been employed, in some instances. However, the complete incorporation of these materials into the cured final product has often been difficult. Furthermore, procedures for preparing, for example, acrylated polyesters or other types of polyesters which contain residual unsaturation have been costly, difficult to employ, and, in fact, have not always produced the desired end products.

It is an object of this invention to prepare ultraviolet coatings which can be thoroughly cured.

It is another object of this invention to prepare ultraviolet curable coatings which exhibit cure rates equivalent to essentially monomeric ultraviolet coatings.

It is another object of this invention to prepare ultraviolet curable systems which contain polymers that are compatible with the system and which produce clear films.

These and other objectives are obtained by preparing the compositions of the instant invention.

SUMMARY OF INVENTION

Basically, this invention involves an ultraviolet curable composition blend which comprises four basic parts.

1. About 5 to about 100 percent, by weight, based on the total curable system of the reaction product of at least about 30 percent, by weight, based on the reactants, at temperatures up to about 500° F. of an acrylate polymer containing both carboxyl and hydroxyl groups and a mixture of maleic anhydride and added polyol in the ratio of about 1.0 to about 10 percent, by weight, of maleic anhydride, to about 15 to about 35 percent, by weight, of polyol.
2. About 95 to about 0 percent, by weight, on the same basis, of a polyethylenically unsaturated compound containing at least about two alpha beta ethylenic unsaturation sites per molecule.
3. About 0 to about 55 percent, by weight, on the same basis, of a mono-ethylenically unsaturated vinyl polymerizable material; and
4. An ultraviolet photoinitiator.

These materials are then applied to the desired substrate and subjected to ultraviolet light.

DESCRIPTION OF INVENTION

The acrylic polymers of the instant invention contain about 20 to about 97 percent, by weight, of an alkyl ester of acrylic or methacrylic acid, represented by the general formula

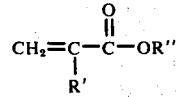

wherein R' is a hydrogen atom or a methyl group and R'' is an alkyl group having from one to eight carbon atoms. Such esters include methyl, ethyl, propyl, isopropyl, butyl, isobutyl, amyl, isoamyl, hexyl, heptyl, 2-ethylhexyl, and octyl acrylate and methacrylate.

In addition to the above acrylate or methacrylate ester monomer, the co-polymers of the instant invention can contain other ethylenically unsaturated monomers which are polymerizable therewith. Examples of these monomers include styrene, vinyl toluene, vinyl acetate, vinyl propionate, vinyl butyrate, vinyl laurate, vinyl oleate, vinyl stearate, and the other vinyl esters of fatty acids having from 1 to 18 carbon atoms. Likewise, the various esters of polymerizable acids, such as crotonic, itaconic, fumaric acid and maleic acids may be utilized.

Acrylonitrile, methacrylonitrile, acrylamide, methacrylamide, 2-methylstyrene, allyl acetate, glycidyl methacrylate, t-butylaminoethyl methacrylate, vinyl pyrrolidone, N,N-dimethylaminoethyl methacrylate, ethylene, propylene, vinyl chloride, vinyl fluoride, vinylidene fluoride, hexafluoropropylene, chlorotrifluorethylene, and tetrafluorethylene can also be used as the monomers herein.

Generally, any ethylenically unsaturated aliphatic hydroxy-containing monomer may be utilized in the amounts set forth hereafter in the instant invention. However, more preferred are the hydroxy acrylates and methacrylates having the general formula:

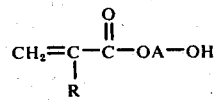

wherein R is a hydrogen atom or methyl group and A is an alkylene group containing two to six carbon atoms. Examples of these monomers are hydroxyethyl acrylate or methacrylate, hydroxypropyl acrylate or methacrylate, and hydroxyhexyl acrylate or methacrylate. Generally, these monomers can be prepared by reacting epoxide-containing molecules, such as propylene oxide or ethylene oxide, with polymerizable acids, such as methacrylic or acrylic acid.

In addition to the hydroxy-containing monomer is an ethylenically unsaturated polymerizable acid-containing monomer. Preferably this monomer is selected from the group consisting of acrylic acid, methacrylic acid, crotonic acid, and itaconic acid, although other acids can also be utilized.

Where acrylate- or methacrylate-containing hydroxy or acid-containing monomers are utilized, their percentage may be added to the percentage of the acrylate or methacrylate ester monomer to determine the total amount of acrylic or methacrylic monomer present.

The hydroxy monomers should be utilized in the instant invention in weight ranges of about 2 to about 20 percent, by weight, based on the total acrylic polymer composition, preferably about 2 to about 5 percent. The acid-containing monomer should be utilized in the range of about one to about 10 percent, on the same basis, preferably about 2 to about 5 percent. The other monomer copolymerizable with the acrylate monomer can be utilized in about the 10 to 50 percent range on the same basis.

The acrylate polymers of the instant invention are prepared by coreacting the desired monomers in the presence of a catalytic amount of a free radical generating catalyst. Included are benzoyl peroxide, tertiary butyl peroctoate, tertiary butyl perbenzoate, tertiary butyl hydroperoxide, cumyl hydroperoxide, dicumyl peroxide, ditertiary butyl peroxide, and the like.

The catalyst should be added to the reaction over at least 30 minutes and preferably over the same period of time that the monomer is added. Catalyst levels can vary from about 0.5 percent to 10 percent, based on the total monomer weight, preferably 0.5 to 5 percent.

In carrying out the process of the instant invention, substantially all, i.e., at least about 30 percent, by weight, of a reaction solvent is added to the reaction vessel and heated to the desired temperature. In choosing the amount of solvent to be utilized, the final reaction solids, after all monomers have been added, should be no lower than about 30 percent, preferably about 45 to 60 percent solids, based on the total weight of the solvent and polymer.

Any solvent having a boiling point in the temperature range employed to carry out the reaction of the instant invention may be utilized. All that is required is that the solvent not be interferingly reactive with the polymers utilized in the instant invention, and be of sufficient volatility to be removable after the polymerization is completed.

Examples of these solvents include aromatic solvents, such as xylene, benzene, and toluene; hydrocarbon fractions, such as mineral spirits and the various naphthas, as well as the various alcohols, ethers, esters, and mixed ethers-esters or ether-alcohols.

Substantially all of the solvent utilized is added to the reactor and the reactor heated to the desired reaction temperature, which may range up to about 150° C. At this point, an addition of substantially all of the monomer is begun. Small amounts, i.e., up to about 40 percent of the total monomer weight may be placed in the reaction vessel with the solvent. The addition is carried out over at least about 30 minutes. Not all of the monomers need be mixed together; rather separate additions of different monomers or different ratios of different monomers, may be carried out. Preferably, the addition time should be in the range of about 1 to 10 hours, most preferably 2 to 6 hours.

The initiators which are utilized in the instant invention may be either mixed with the monomer or added separately over the general period of the monomer addition.

Addition times of both initiators and monomers may vary and the various monomers may be added over regular periods of time, periodically, or over gradually increasing or decreasing periods of time, as long as the total amount of monomer addition is substantially within the ranges indicated.

Reaction temperature should be maintained within the desired temperature ranges following monomer addition for a time sufficient to cause conversion of all the monomer to polymer. This is usually measured by determining the solids content of the reaction mixture by measuring the amount of solvent that evaporates, when test samples are held for about 20 minutes at 220° C. When the solids content is empirically determined to be about 90 percent of theoretical, the reaction is deemed complete.

At this point, it is necessary that the reaction solvent be removed by either increasing the reactor heat or applying a vacuum, or both. Usually the solvent stripping procedure requires up to about two hours and should be considered complete when 80 to 90 weight percent of the solvent has been removed. It is preferred that a vacuum be utilized in addition to heat to minimize degradation of the polymer.

After the reaction is complete, the second components of the instant invention are added to the reactor. These components comprise about 15 to about 35 percent, by weight, preferably about 20 to about 30 percent, by weight, based on the reaction product, of a polyhydroxy material, and about 1 to about 10 percent, preferably about 3 to about 7 percent, by weight, based on the reactants, of maleic anhydride or maleic or fumaric acids. The polyols include the glycols such as ethylene glycol, propylene glycol, neopentyl glycol, butylene glycol, hexanediol and the various glycol ethers, such as diethylene glycol or triethylene glycol. Triols and tetraols may also be utilized, including such materials as trimethylol propane, trimethylol ethane, glycerine, pentaerythritol, as well as the polymerized polyols, such as, for example, dipentaerythritol.

In some cases it may be desirable to increase the ester content of the polymer as opposed to the vinyl polymer content. In such instances, added polyol and polyacid may be employed. In any event, the total vinyl content of the final polymer should not be less than about 30 weight percent, preferably about 50 to about 80 percent, by weight.

The reaction between the acrylic polymer and the added polybasic acid and polyol is carried out by heating the reactants up to about 500° F. and holding until the desired acid value is obtained. Of course, reaction extent may be measured by other means, such as infrared spectroscopy, hydroxyl value, or the like. Reaction catalysts such as litharge, dibutyl tin oxide, calcium hydroxide, paratoluene sulfonic acid and the like, may be employed, although they are not required. In most instances, an acid value in the range of about 10 to about 40 is desired.

The unsaturated acrylic polyester as prepared above, is blended into the ultraviolet curable compositions of the instant invention in weight ratios ranging from about 5 to about 100 percent, by weight, based on the total curable composition.

In addition to the acrylic unsaturated polyester the ultraviolet curable compositions of the instant invention contain from about 0 to about 95 percent, by weight, based upon the total curable composition, of an alpha beta ethylenically unsaturated vinyl polymerizable compound containing at least two vinyl polymerizable groups per molecule. Included are unsaturated esters of polyols and particularly, such esters of the alpha methylene carboxylic acids, e.g., ethylene diacrylate, diethylene glycol diacrylate, glycerol diacrylate, glycerol triacrylate, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetraacrylate and methacrylate, trimethylolpropane triacrylate, trimethylolethane triacrylate, dipentaerythritol hexacrylate, tripentaerythritol octaacrylate, sorbitol hexacrylate, 1,3-propanediol diacrylate, 1,5-pentanediol dimethacrylate, hexanediol diacrylate, the bis-acrylates and methacrylates of polyethylene glycols of a molecular weight of 200–1500, and the like; unsaturated amides, particularly those of the alpha methylene carboxylic acids, especially those of alpha, omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis(gamma-methacrylamidopropoxy)ethane, beta-methacrylamidoethyl methacrylate, N-beta-hydroxy-ethyl-beta-(methacrylamido)ethyl acrylate, and N,N-bis(beta-methacryloxyethyl)acrylamide; vinyl esters such as divinyl succinate, divinyl adipate, divinyl phthalate, divinyl terephthalate, divinyl benzene-1,3-disulfonate, and divinyl butane-1,4-disulfonate; styrene and derivatives thereof and unsaturated aldehydes, such as sorbaldehyde (hexadienal). An outstanding class of these preferred addition polymerizable components are the esters and amides of alpha-methylene carboxylic acids and substituted carboxylic acids with polyols and polyamides wherein the molecular chain between the hydroxyl and amino groups is solely carbon or oxygen-interrupted carbon.

The polyethylenic unsaturation can be present as a substituent attached to a preformed polymer resin, such as an alkyd, a polyester, a polyamide, or a vinyl homo- or copolymer. Also included are polymeric unsaturated materials prepared by reacting vinyl hydroxy or carboxy materials with polyepoxides, e.g., acrylic acid with the diglycidyl ether of bisphenol A. Also included are polymers such as polyvinyl acetate/acrylate, cellulose acetate/acrylate, cellulose acetate/methacrylate, N-acryloxymethylpolyamide, N-methacryloxymethylpolyamide, allyloxymethylpolyamide, etc. These materials are in addition to the unsaturated acrylic polyesters as described above.

In addition to the aforementioned polyfunctional polymerizable compounds, compounds containing a single polymerizable ethylenically unsaturated group of the structure $$>C=C<$$

can also be utilized. In addition to traditional "monomers", as described hereafter, the monounsaturated compounds may be polymeric materials, as previously described, containing on the average a single site of unsaturation on each polymer molecule. These monomers can be aliphatic, aromatic, cycloaliphatic or any variant thereof. Among the monomers are included styrene, 4-methylstyrene, alphamethylstyrene, and the like; acrylic acid and its nitrile, amide and $C_1$–$C_{12}$ alkyl, aryl, or hydroxy alkyl derivatives, such as acrylonitrile, ethylacrylate, 2-ethylhexyl acrylate, butyoxyethoxyethyl acrylate, hydroxyethyl acrylate, as well as others; the vinyl halides, such as vinyl chloride, vinylidene chloride, and the like; vinyl ketones such as vinyl phenyl ketone, vinyl methyl ketone, alphachlorovinyl methyl ketone, and the like; the vinyl thioethers such as vinyl ethyl sulfide, vinyl p-tolylsulfide, divinyl sulfide, and the like. Other monomers include vinyl ethyl sulfone, vinyl ethyl sulfoxide, vinyl sulfonic acid, sodium vinyl sulfonate, vinyl sulfonamide, vinyl pyridine, N-vinyl pyrrolidone, N-vinyl carbazole, and the like. Generally any alpha beta ethylenically unsaturated monomer which does not interfere with the ultraviolet curing mechanism may be utilized, and as such, these monomers are well known in the art.

These compounds may be added in amounts up to about 55 percent, by weight, based upon the total curable composition, preferably about 10 to about 30 percent.

The instant invention can also contain up to about 60 percent, by weight, based upon the total curable system, of a polymeric material containing no polymerizable unsaturation. Among the polymers are the polyolefins and modified polyolefins, the vinyl polymers, the polyethers, the polyesters, the polylactones, the polyamides, the polyurethanes, the polyureas, the polysiloxanes, the polysulfides, the polysulfones, the polyformaldehydes, the phenol-formaldehyde polymers, the natural and modified natural polymers, the heterocyclic polymers, and the like.

Illustrative of these polymers are the acrylic polymers such as poly(acrylic acid), poly(methyl acrylate), poly(ethyl acrylate), poly(methacrylic acid), poly(methyl methacrylate), poly(ethyl methacrylate); poly(vinyl chloride); poly(vinyl alcohol); poly(ethylene/propylene/5-ethylidenebicyclo[2.2.1]-hept-2-ene); polyethylene; polypropylene; synthetic rubbers, e.g., butadiene/acrylonitrile copolymers and chloro-2-butadiene 1,3 polymers; the polyesters, copolyesters, polyamides and copolyamides, such as polycaprolactone, poly(caprolactone/vinyl chloride), poly(ethylene glycol terephthalate), poly(hexamethylene succinate), poly(hexamethylene maleate), poly(hexamethylene carbonate), poly(caprolactam), poly(hexamethylene adipamide), and the like; the polyethers such as poly(glutaraldehyde), polyethylene oxide, polypropylene oxide, poly(tetrahydrofuran), polycyclohexene oxide, copolymers of ethylene oxide and propylene oxide with starters containing reactive hydrogen atoms such as the mixed copolymers using ethylene glycol, glycerol, sucrose, etc., as the starter; vinylidene polymers and copolymers, e.g., vinylidene chloride/acrylonitrile, vinylidene chloride/methacrylate and vinylidene chloride/vinyl acetate polymers; ethylene/vinyl acetate copolymers; the polyureas and polyurethanes, such as described in *Polyurethanes: Chemistry and Technology*, Volumes I and II, Sanders and Frisch, published by Interscience Publishers; the polycarbonates; polystyrenes; polyvinyl acetals, e.g., polyvinyl butyral, polyvinyl formal; the cellulose ethers, e.g., methyl cellulose, ethyl cellulose, and benzyl cellullose; the cellulose esters, e.g., cellulose acetate, cellulose acetate succinate, and cellulose acetate butyrate; as well as the natural and modified natural polymers such as gutta percha, cellulose, gelatin, starch, silk, wool, and the like; the siloxane polymers and copolymers; the formaldehyde polymers such as polyformaldehyde; formaldehyde resins such as phenol-formaldehyde, melamine-formaldehyde, urea-formaldehyde, aniline-formaldehyde and acetone-formaldehyde; phenolic resins and the like.

If desired, the photo-polymerizable compounds can also contain immiscible polymeric or nonpolymeric organic or inorganic fillers or reinforcing agents, e.g., the organophilic silicas, bentonites, silica, powdered glass, colloidal carbon, as well as various types of dyes and pigments, in varying amounts. The fillers are useful in improving the strength, reducing tack and as coloring agents in the coatings of this invention.

The ultraviolet curable compositions of the instant invention are compounded with ultraviolet photoinitiators in amounts ranging from about 0.1 to about 10 percent, by weight, based on the total curable composition.

These photoinitiators or photosensitizers fall into many classes and include compounds such as benzoin derivatives, as disclosed in German Patent No. F523401VC/396, acetophenone, propiophenone, xanthone, fluorenone, benzaldehyde, fluorene, anthraquinone, triphenylamine, carbazole, 3- or 4-methylacetophenone, 3- or 4-pentylacetophenone, 3- or 4-methoxyacetophenone, 3- or 4-bromoacetophenone, 3- or 4-allylacetophenone, p-diacetylbenzene, 3- or 4-methoxybenzophenone, 3- or 4-methylbenzophenone, 3- or 4-chlorobenzophenone, 4,4'-dimethoxybenzophenone, 4-chloro-4'-benzylbenzophenone, 3-chloroxanthone, 3,9-dichloroxanthone, thioxanthone, and chloronated thioxanthones, 3-chloro-8-nonylxanthone, 3-methoxyxanthone, 3-iodo-7-methoxyxanthone, and the like.

Also included are the acetophenone photosensitizers of the type described in U.S. Pat. No. 3,715,293, having the structure

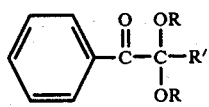

I.

wherein R is alkyl of from 1–8 carbon atoms, or aryl with 6 carbon atoms, and R' is hydrogen, alkyl of from 1–8 carbon atoms, aryl of from 6–14 carbon atoms or cycloalkyl of 5–8 carbon atoms.

The alkylphenone photosensitizers having the formula

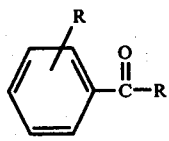

II.

the benzophenone type photosensitizers having the formula

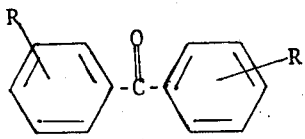

III.

the tricyclic fused ring type having the formula

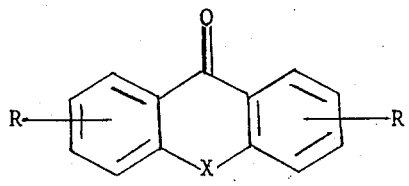

IV.

and the pyridyl type having the formula

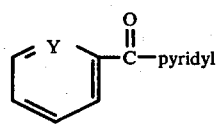

V.

wherein the various substituents are as further described in U.S. Pat. No. 3,759,807, are also included.

Other photosensitizers include 1- and 2- chloroanthraquinone, 2-methylanthraquinone, 2-tertiary butyl anthraquinone, octamethylanthraquinone, 1-4-naphthoquinone, 9-10-phenanthrenequinone, 1,2-benzanthraquinone, 2-3-benzanthraquinone, 2-methyl-1,4-naphthoquinone, 2-3-dichloronaphthoquinone, 1-4-dimethylanthraquinone, 2-3-dimethylanthraquinone, 2-phenylanthraquinone, 2-3-diphenylanthraquinone, sodium salts of anthraquinone alpha-sulfonic acid, 3-chloro-2-methylanthraquinone, and the like. Other photoinitiators which are also useful are described in U.S. Pat. No. 2,760,863 and include vicinal ketadonyl compounds, such as diacetyl benzyl, etc., alpha ketadonyl alcohols, such as benzoin, pivaloin, etc., acyloin ethers, e.g., benzoin methyl and ethyl ethers, etc., alpha hydrocarbon substituted aromatic acyloins, including alphamethyl benzoin, alphaallyl benzoin, and alpha phenyl benzoin. Also included are the diacylhalomethanes, corresponding to one of the general formulas:

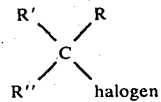

and

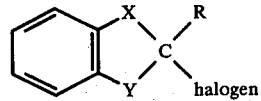

wherein halogen represents a halogen atom such as chlorine or bromine; R represents a hydrogen atom, a chlorine or bromine atom, or an acetyloxy group; R' and R" (same or different) represent a benzoyl group, a nitrobenzoyl group, a dimethylamino benzoyl group, a phenyl sulfonyl group, a carboxy phenyl sulfonyl group, a methylphenyl sulfonyl group, or a naphthoyl group; and X and Y (same or different) represent a carbonyl group or a sulfonyl group. Included are 2-bromo-1,3-diphenyl-1,3-propane dione; 2,2-dibromo-1,3-indane dione; 2,2-dibromo-1,3-diphenyl-1,3-propane dione; 2-bromo-2-(phenylsulfonyl acetal phenone) and the like, as further described in U.S. Pat. No. 3,615,455.

Other photoinitiators are cataloged by G. Delzenne in *Industrie Cimique Belge*, 24 (1959), 739–764. Most preferred among the added initiators are benzoin and its alkyl ethers, benzophenone and its derivatives, as in Formula III, xanthone, thioxanthones and chlorinated thioxanthones, acetophenone derivatives, as set out in formula I, and halogenated, aliphatic and aromatic polychlorinated biphenyls and polyphenyls.

Although not required, certain organic amines can be added to the photosensitizers above-described to further enhance the cure rate of the compositions of the instant invention in amounts up to about 500 percent, by weight, of the photosensitizer, preferably up to about 50 percent, by weight. The amines can be primary, secondary, or tertiary, and can be represented by the general formula:

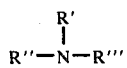

wherein R' and R" taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having 6 to about 12 ring carbon atoms; R''' has the same meaning as R' and R" with the exception that it cannot be hydrogen and that it cannot be aryl when both R' and R" are aryl. When taken together R" and R''' can be a divalent alkylene group $+C_nH_{2n}+$ having from 2 to about 12 carbon atoms, a divalent alkenylene group $+C_nH_{2n-1}+$ having from 3 to about 10 carbon atoms, a divalent alkadienylene group $+C_nH_{2n-2}+$ having from 5 to about 10 carbon atoms, a divalent alkatrienylene group $+C_nH_{2n-3}+$ having from 5 to about 10 carbon atoms, a divalent alkyleneoxyalkylene group $+C_xH_{2x}OC_xH_{2x}+$ having a total of from 4 to about 12 carbon atoms, or a divalent alkyleneaminoalkylene group

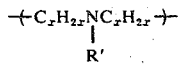

having a total of from 4 to about 12 carbon atoms. As previously indicated, the amines can be substituted with other groups; thus, the R', R" and R''' variables, whether taken singly or together, can contain one or more substituents thereon. The nature of such substituents is generally not of significant importance and any substituent group can be present that does not exert a pronounced deterrent effect on the ultraviolet crosslinking reaction.

Illustrative of suitable organic amines one can mention are methylamine, dimethylamine, trimethylamine, diethylamine, triethylamine, propylamine, isopropylamine, diisopropylamine, triisopropylamine, butylamine, tributylamine, t-butylamine, 2-methylbutylamine, N-methyl-N-butylamine, di-2-methylbutylamine, trihexylamine, tri-2-ethylhexylamine, dodecylamine, tridodecylamine, tri-2-chloroethylamine, di-2-bromoethylamine, methanolamine, ethanolamine, diethanolamine, triethanolamine, methyldiethanolamine, dimethylethanolamine, isopropanolamine, propanolamine, diisopropanolamine, triisopropanolamine, butylethanolamine, dihexanolamine, 2-methoxyethylamine, di-2-ethylhexylamine, tri-2-ethoxyethylamine, 2-hydroxyethyldiisopropylamine, 2-aminoethylethanolamine, allylamine, butenylamine, dihexadienylamine, cyclohexylamine, tricyclohexylamine, trimethylcyclohexylamine, bis-methylcyclopentylamine, tricyclohexenylamine, tricyclohexadienylamine, tricyclopentadienylamine, N-methyl-N-cyclohexylamine, N-2-ethylhexyl-N-cyclohexylamine, diphenylamine, phenyldimethylamine, methylphenylamine, ditolylamine, trixylyl-amine, tribenzylamine, triphenethylamine, benzyldimethylamine, benzyldihexylamine, trischlorophenethylenimine, N-methylethylenimine, N-cyclohexylethylenimine, piperidine, N-ethylpiperidine, 2-methylpiperidine, 1,2,3,4-tetrahydropyridine, 1,2-dihydropyridine, 2-, 3- and 4-picoline, morpholine, N-methyl morpholine, N-2-hydroxyethylmorpholine, N-2-ethoxyethylmorpholine, piperazine, N-methylpiperazine, N,N''-dimethylpiperazine, 2,2-dimethyl-1,3-bis[3(N-morpholinyl)-propionyloxy]-propane, 1,5-bis[3(N-morpholenyl)-propionyloxy]-diethyl ether, and the like. The preferred organic amines are the tertiary amines, with the alkanol amines being most preferred. The specific preferred amine activators are triethanolamine, morpholine, and methyldiethanolamine.

The compositions of the instant invention after being prepared in the ratios as set out above can be applied to the material to be coated by conventional means, including brushing, spraying, dipping, curtain and roll coating techniques, and may, if desired, be dried under ambient or oven conditions to provide coating films on the substrate. The substrate can be of any composition, e.g., wood, metal, paper, plastic, fabric, fiber, ceramic, concrete, plaster, glass, etc. The compositions when applied to the desired substrate are more compatible and provide products which are clearer than was previously possible with ultraviolet coatings of the prior art.

After the composition is aplied to the desired substrate, it is exposed to electromagnetic radiation having wave lengths of above about 2000 Angstrom units, preferably from about 2000 up to about 5000 Angstroms. Exposure should be from a source located about 1 to 5 inches from the coating for a time sufficient to cause crosslinking of the composition and can range from about 0.1 seconds up to about 1 min./linear ft. Generally, the light radiation will have power of about 200 watts per linear inch.

The light radiation can be ultraviolet light generated from low, medium and high pressure mercury lamps. This equipment is readily vailable and its use is well known to those skilled in the art of radiation chemistry. Other sources include electron beam radiation, plasma arc, laser beams, etc.

In the following examples all parts and percentages are by weight, unless otherwise indicated.

EXAMPLE 1

Into a reaction flask equipped with a reflux condenser, mechanical agitator, thermometer, and addition funnel were added 270 grams of xylene and 6.38 grams of dicumyl peroxide. The solvent mixture was heated under agitation to about 140° C., at which time a blend of 282 parts of methyl methacrylate, 140 parts of ethyl acrylate, 18 parts of beta hydroxyethyl methacrylate, 10 parts of acrylic acid and 10 parts of dicumyl peroxide were added from the addition funnel over about two hours, maintaning a reflux. After the addition was completed, a solution containing 1.45 parts of dicumyl peroxide and 30 parts of xylene was added at reflux temperature over half an hour.

A blend of 267 parts of 1,6-hexanediol, 243 parts of phthalic anhydride and 40 parts of maleic anhydride were added to the reactor, resulting in a polyester reactant/vinyl polymer reactant ratio of 55 to 45. Heat was increased to about 220° C. and the xylene solvent was removed along with water of reaction. Reaction was maintained at this temperature for 6 hours resulting in a product having an acid value of 10.

EXAMPLES 2 & 3.

70 parts of the material prepared in Example 1 were blended respectively with 30 parts of trimethylolpropane triacrylate (Example 2) and 70 parts of trimethylolpropane triacrylate (Example 3). The blends were drawn down on cold rolled steel panels to a wet film thickness of 1 mil and cured under an ultraviolet Hanovia lamp having a power of 200 watts/linear inch. Exposure was for about 1–2 seconds. In each instance, the films were hard, exhibited pencil hardnesses of 2-H, Tukon hardnesses of 11, reverse impacts of 4-in-lbs. and passed 200 MEK rubs.

What is claimed is:

1. An ultraviolet coating composition comprising the reaction product of:
   a. at least about 30 percent, by weight, of a copolymer comprising about 20 to about 97 percent, by weight, based on the total copolymer weight, of an acrylate ester monomer, about 0 to about 73 percent, by weight, on the same basis, of another monomer copolymerizable therewith, about 1 to about 10 percent, by weight, based on the total copolymer weight, of an unsaturated carboxylic acid monomer, and about 2 to about 20 percent, on the same basis, of an hydroxy-containing unsaturated monomer;
   b. about 1 to about 10 percent, by weight, based on the reaction product, of a carboxylic acid or anhydride selected from maleic acid, fumaric acid, and maleic anhydride; and
   c. about 15 to about 35 percent, by weight, based on the reaction product of a polyhydroxy material;
   and about 0.1 to about 10 percent, by weight, based on the total curable composition of an ultraviolet photoinitiator.

2. The composition of claim 1 in admixture with an organic amine.

3. The composition of claim 1 wherein the acrylate monomer is represented by the general formula

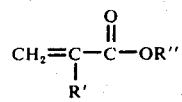

wherein R' is hydrogen or a methyl group and R'' is an alkyl group having from one to eight carbon atoms.

4. The composition of claim 1 wherein the hydroxy monomer is a hydroxy acrylate or methacrylate having the general formula

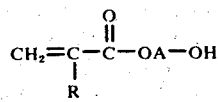

wherein R is a hydrogen atom or methyl group and A is an alkylene group containing two to six carbon atoms.

5. The composition of claim 1 wherein the hydroxy monomer and the acid monomer are present at the 2 to 5 percent level.

6. The composition of claim 1 wherein the acrylic copolymer is prepared utilizing a catalytic amount of a free radical initiator.

7. The composition of claim 1 wherein the polycarboxylic acid is maleic anhydride.

8. The composition of claim 1 wherein the polyhydroxy material is selected from glycols, triols and tetraols.

9. The composition of claim 1 wherein the acrylic copolymer is present at the 50 to 80 percent, by weight, level.

10. The composition of claim 1 wherein the reaction product has an acid value in the range of about 10 to 40.

11. The ultraviolet curable coating composition of claim 1, wherein up to about 95 percent, by weight, of an alpha beta ethylenically unsaturated vinyl polymerizable compound containing at least two sites of ultraviolet polymerizable unsaturation, and up to about 55 percent, by weight, of a monoethylenically unsaturated ultraviolet polymerizable monomer, is added to said reaction product, the total of said reaction product said alpha beta ethylenically unsaturated vinyl polymerizable monomer containing at least about two sites of ultraviolet polymerizable unsaturation and said monoethylenically unsaturated ultraviolet polymerizable monomer is 100 weight percent.

* * * * *

UNITED STATES PATENT AND TRADEMARK OFFICE
CERTIFICATE OF CORRECTION

PATENT NO. : 3,992,276
DATED : November 16, 1976
INVENTOR(S) : Thomas M. Powanda, et al It is certified that error appears in the above—identified patent and that said Letters Patent is hereby corrected as shown below:

The title page should be deleted to insert the attached title page therefor.

Signed and Sealed this

Eighth Day of April 1980

[SEAL]

Attest:

SIDNEY A. DIAMOND

Attesting Officer

Commissioner of Patents and Trademarks

United States Patent [19]

Powanda et al.

[11] 3,992,276

[45] Nov. 16, 1976

[54] UNSATURATED POLYESTERS FOR ULTRAVIOLET CURABLE COATINGS

[75] Inventors: Thomas M. Powanda, Middlesex; Charles B. Rybny, Clifton; Charles A. DeFazio, Berkeley Heights, all of N.J.

[73] Assignee: Celanese Corporation, New York, N.Y.

[22] Filed: Mar. 17, 1975

[21] Appl. No.: 558,977

[52] U.S. Cl. .................... 204/159.16; 204/159.12; 204/159.13; 204/159.15; 204/159.17; 204/159.18; 204/159.19; 260/862; 260/873; 260/885; 260/901; 427/35; 427/53; 427/54; 428/458

[51] Int. Cl.$^2$ .................... C08F 8/00; C08L 33/12; C08L 67/06

[58] Field of Search ............... 204/159.16, 159.18, 204/159.19, 159.15; 260/885, 862, 873, 901

[56] References Cited

UNITED STATES PATENTS

| | | | |
|---|---|---|---|
| 3,759,807 | 9/1973 | Osborn et al. | 204/159.23 |
| 3,770,490 | 11/1973 | Parker | 204/159.16 |
| 3,865,901 | 2/1975 | Klein-Doepke et al. | 204/159.15 |
| 3,874,906 | 4/1975 | Prucnal et al. | 204/159.16 |
| 3,876,587 | 4/1975 | Matsui et al. | 260/78.4 D |
| 3,879,340 | 4/1975 | Sekmakas et al. | 260/862 |

*Primary Examiner*—Murray Tillman
*Assistant Examiner*—Thurman K. Page

[57] ABSTRACT

An ultraviolet curable coating composition having improved clarity and resin compatability is prepared by co-reacting an acrylate or methacrylate co-polymer containing hydroxy and carboxy groups with added polyol and maleic anhydride to form an unsaturated polyester, and then blending the unsaturated polyester with polyunsaturated monomers, monounsaturated monomers and a photoinitiator, all of which will cure when exposed to ultraviolet radiation.

11 Claims, No Drawings